United States Patent
Needham

(10) Patent No.: US 6,474,072 B2
(45) Date of Patent: Nov. 5, 2002

(54) DISTRIBUTED AIR CONDITIONING SYSTEM

(76) Inventor: Frederick Johnston Needham, 26 Albany Highway, Glenfield, Auckland (NZ)

( * ) Notice: Subject to any disclaimer, the term of this patent is extended or adjusted under 35 U.S.C. 154(b) by 0 days.

(21) Appl. No.: 09/861,853

(22) Filed: May 22, 2001

(65) Prior Publication Data

US 2002/0011071 A1 Jan. 31, 2002

(30) Foreign Application Priority Data

May 22, 2000 (NZ) .................................................. 504686

(51) Int. Cl.[7] .......................... F25B 21/02; F25D 23/12; A47D 13/10
(52) U.S. Cl. ....................... 62/3.2; 62/261; 297/180.13
(58) Field of Search ..................... 62/3.2, 261, 259.1, 62/244; 297/180.1, 180.13, 180.15; 165/46

(56) References Cited

U.S. PATENT DOCUMENTS

| | | | | |
|---|---|---|---|---|
| 4,923,248 A | | 5/1990 | Feher ........................... 297/180 |
| 5,002,336 A | | 3/1991 | Feher ........................... 297/180 |
| 5,138,851 A | * | 8/1992 | Mardikian .................... 62/244 |
| 5,524,439 A | | 6/1996 | Gallup et al. .................. 62/3.5 |
| 6,273,810 B1 | * | 8/2001 | Rhodes, Jr. et al. ......... 454/120 |

* cited by examiner

Primary Examiner—Chen-Wen Jiang
(74) Attorney, Agent, or Firm—Jacobson Holman PLLC

(57) ABSTRACT

A self contained air conditioned seat to control the temperature climate in an air bubble generated around the seat occupant is described. It includes an air bubble at a controlled temperature for the upper body and seat of the occupant, a separate air bubble for the legs of the occupant and a controller which allows the occupant to have personal control of the temperature in the two zones. Temperature sensors are located in one or more of the tips of the arm rests, the heat rest, beneath the seat bottom and in the return air ducts, to help maintain the air bubble temperature in the two zones.

13 Claims, 3 Drawing Sheets

DISTRIBUTED AIR CONDITIONING SYSTEM

BACKGROUND OF THE INVENTION

1. Field of the Invention

The present invention relates to air conditioning systems.

2. Description of the Prior Art

Office buildings are the largest users of lair conditioning world-wide. With conventional office building air conditioning systems there is limited personal temperature control because it is very expensive or impossible to provide personal control for each area or person. Normally each room is maintained at one temperature even though different people prefer different temperatures. Women often complain of cold legs because stratification means warm air rises and temperature are lower at floor level. Surveys confirm that there is low to medium level dissatisfaction with most air conditioning systems and nothing can be done to relieve this with existing systems without considerable expense.

Air conditioning systems are very large consumers of energy. There is constant pressure to reduce energy consumption of air conditioning systems both from a cost and environmental point of view. In conventional systems the entire volume of the building is conditioned, even though much of it is not normally occupied for more than a few moments. Most large buildings incorporate energy management systems in various forms but maintain the extravagance of conditioning space which is not used. Many smaller buildings using packaged air conditioning systems have no energy management program because of cost. This is a penalty on the environment and service providers.

U.S. Pat. No. 4,923,248 issued to Feher discloses a seatpad and backrest for vehicles using Peltier thermoelectric modules to warm and cool an occupant through the surface of the seatpad.

U.S. Pat. No. 5,002,336 issued to Feher discloses a joined seat and back rest construction for vehicles using Peltier thermoelectric modules to warm and cool an occupant through the surface of the seatpad. U.S. Pat. No. 5,524,439 issued to Gallup and others discloses a variable temperature seat climate control system designed for vehicles but useable in other applications where the occupant is "typically fixed in one position with a large portion of their body's surface against the surface of a seat, isolated from the effects of the temperature conditioned air." The seat provides variable temperature air through the seat back or seat bottom to cool the occupant where his body is touching or in close proximity to the seat.

These devices are not designed to replace conventional air conditioning systems, particularly in an office building. They are designed to make seats, and particularly the seat surface, more comfortable for semi-immobile users or to reduce the surface temperature of seats exposed to the sun. The above systems favour the use of the Peltier system which is very inefficient as compared with a refrigeration system. It would be unacceptable in large installations as envisaged in the present application, but is easier to install in motor vehicles and the like where space is limited.

SUMMARY OF THE INVENTION

It is an object of the present invention to provide an air conditioning system and/or a unit therefor which will at least go some way toward overcoming the above disadvantages or which will at least provide the public with a useful choice.

In a first aspect the invention consists in a self contained air conditioned seat to control the temperature climate in an air bubble generated around the seat occupant comprising:

a cooling and heating system to generate warm or cool air;

an air distribution system in the back support and arm rests which receives air from said cooling and heating system and distributes it to maintain an air bubble at a controlled temperature for the upper body and seat of the occupant;

an air distribution system beneath the seat which receives air from said cooling and heating system and distributes it to a separate air bubble for the legs of the occupant;

a controller which activates the cooling and heating and air distribution systems to maintain temperatures selected by the seat occupant and allow the occupant to have personal control of the temperature in the two zones;

temperature sensors for the controller located in one or more of the tips of the arm rests, the heat rest, beneath the seat bottom and in the return air ducts, to help maintain the air bubble temperature in the two zones.

In a second aspect the present invention consists of an air conditioning system for a building comprising:

a plurality of self-contained air conditioned seats, each adapted to control the temperature climate in an air bubble generated around the seat occupant, and a pervasive central air conditioning system to control conditions in the general office area around the seats to provide physiologically acceptable but not necessarily comfortable, minimum and maximum temperatures throughout the building space.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the present invention will now be described with reference to the accompanying drawings in which.

DESCRIPTION OF THE PREFERRED EMBODIMENTS

The present inventions seeks to replace conventional office air conditioning systems. The system addresses these problems by providing air conditioning for the space around the seat only, thereby reducing the volume of space to be air conditioned to the minimum. The air actually surrounding each person seated in the building is about 1 m³ per person. This compares with at least 15–30 m³ allowed for each individual in a typical office. Every seat occupant has personal control of their temperature environment, which is not possible with conventional systems, and the seat can provide a separate temperature zone for the leg area.

One possible disadvantage of the concept is that temperatures in the remainder of the building are not controlled, which could cause discomfort to people moving around. In one aspect of the present this is solved by the provision of a minimal level air conditioning system for the whole building which maintains temperatures between say 14° C. and 27° C. to prevent physiological discomfort and still retain a substantial energy saving. The upper and lower limits can be adjusted based on a balance between user comfort and energy consumption. The designer need not be concerned with local effects of solar radiation, heat transmission, air leakage and the like through the building walls and glazing, except as they affect the total load. Public spaces in the building like restaurants, reception and conference areas may retain full space air conditioning systems.

The air conditioned seat is a self contained apparatus designed to provide a temperature controlled environment for the seat occupant. Its purpose is to eliminate the need for conventional air conditioning of the whole office space by providing an "air bubble" for the seat occupant over which he has complete personal temperature control. In practice most buildings containing the seats will be given a reduced capacity air conditioning system which maintains minimum comfort levels in the general space between the seats for people moving around. Public areas can still be given conventional "full" systems. This combination of the seats and a minimal air conditioning system becomes an integrated air conditioning system. Its principle advantage over conventional "full" building systems are a decrease in the gross power consumption for buildings using the system, and greatly increased control independence for every individual. It is envisaged that because the seats are powered, other features like powered seat adjustment, personalised audio, and IT systems may be added. A different style of seat may also be manufactured for the domestic market.

The seats can also be used in buildings where there is no air conditioning, or which have a conventional "full" air conditioning system which occupants find unsatisfactory for any reason.

Figure 1:
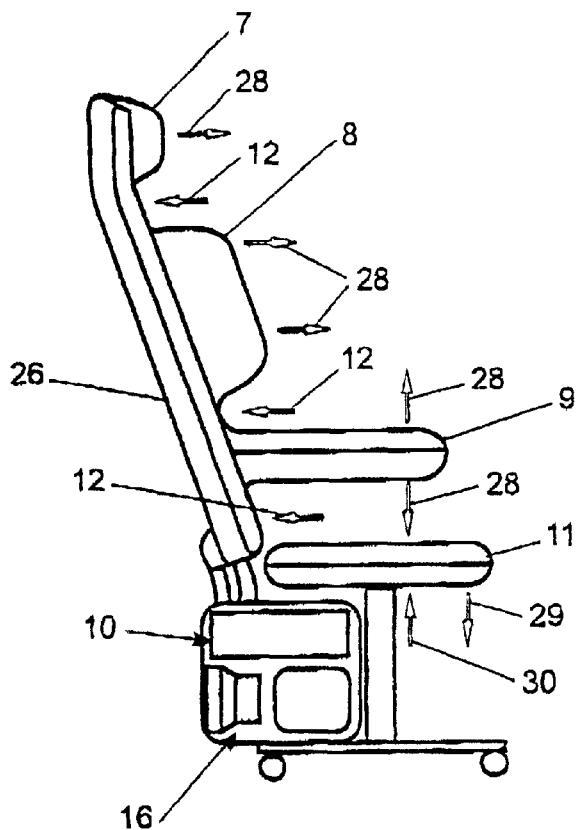
FIG. 1 is a side elevation of a seat according to a preferred embodiment of the present invention.

FIG. 1 gives a visual impression of a possible embodiment of the seat. In the base of the seat is an air conditioning unit including a cooling unit 10 and a condensing unit 16.

Figure 2:
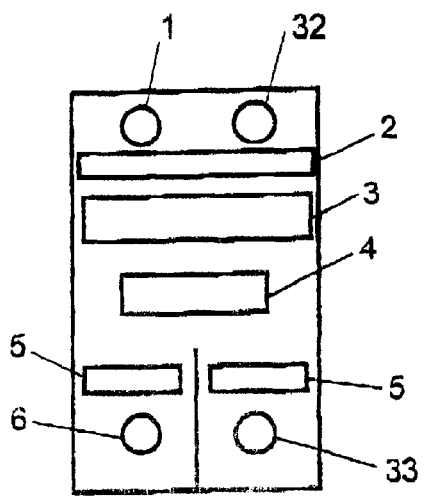
FIG. 2 is a cross sectional plan elevation of an upper level of the machine compartment of the chair of FIG. 1.
Figure 3:
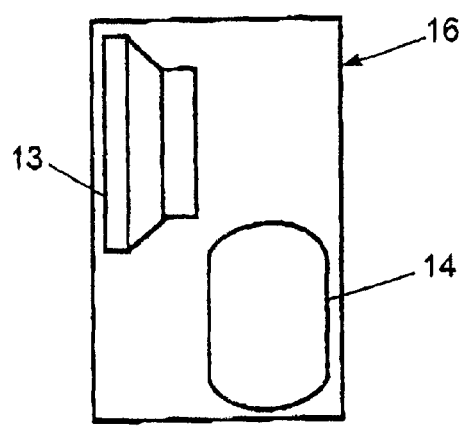
FIG. 3 is a cross sectional plan elevation of a lower level of the machine compartment of the chair of FIG. 1.
Figure 4:
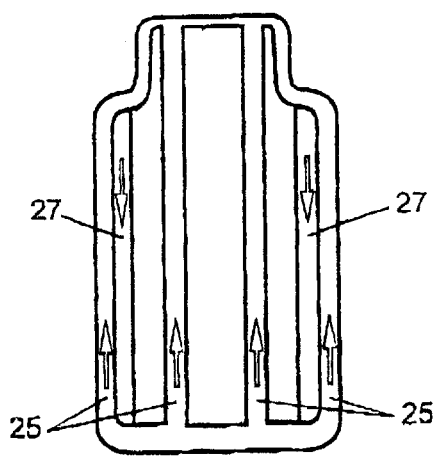
FIG. 4 is a cross sectional elevation of the seat back of the seat of FIG. 1.

The condensing unit, shown in plan in FIG. 3, has a refrigeration compressor 14 and condenser coil and fan 13. The cooling unit, shown in plan in FIG. 2, has a filter 2, evaporator coil 3, fan 4, and electric resistance hating 5.

Alternatively a reverse cycle heat pump system may be used for heating.

Referring to FIGS. 1 and 4 to 8, from the cooling unit 10 cool or warm air is discharged through a duct 6, into the seat back 26. Conditioned air is channeled through supply ducts 25 in the seat back 26 to various discharge points 40 to be dispersed as suggested by arrows 28. Return air is drawn, as indicated by arrows 12, into the seat back to be returned via internal air paths 27, 1 to the cooling unit 10. The discharge points and intake points are arranged so that the air flows maintain a comfort air bubble around the occupant. The return air flows through return ducts 27 back to the cooling unit at duct 1 wherein it mixes with "fresh" room air to maintain comfort conditions.

Figure 5:
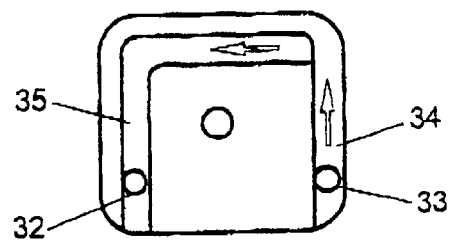
FIG. 5 is a cross sectional elevation of the seat bottom of the seat of FIG. 1.
Figure 6:
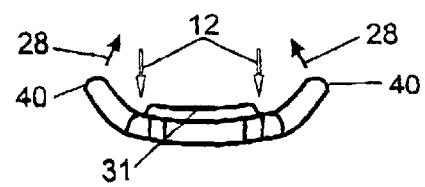
FIG. 6 is a cross sectional plan elevation of the head rest portion of the seat back of the seat of FIG. 1.
Figure 7:
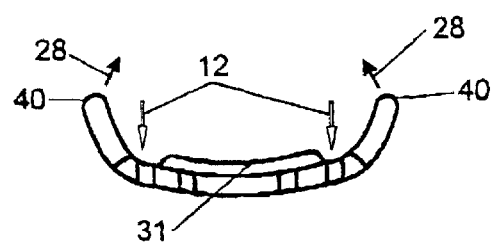
FIG. 7 is a cross sectional plan elevation of the back rest portion of the seat back of the seat of FIG. 1.

Further air from the cooling unit 10 is discharged through duct 33 to the seat bottom 11 entering at duct 34 (see FIG. 5). This air flow discharges down around the occupant's legs, as indicated by arrows 29, to maintain a separate comfort zone air bubble in that area. Many users of air conditioning, particularly women, complain of cold feet and legs. This is a result of stratification caused by warm air rising leaving a cold zone at floor level. The seat of the present invention is intended to reduce this by giving each occupant personal control of the temperature in one or more zones around their person, including a zone in the leg area. Return air 30 is drawn back into the seat bottom and returns through duct 3 to the cooling unit 10 at duct 32 for treatment.

Figure 8:
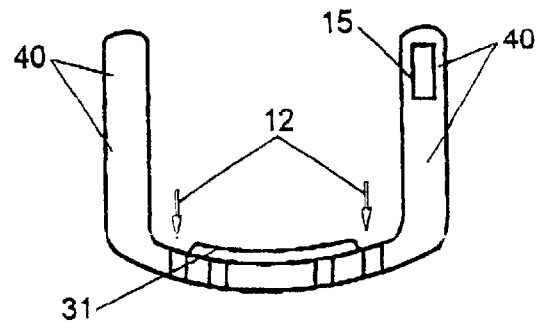
FIG. 8 is a plan elevation from above (with the seat back in cross section) showing the seat arms of the seat of FIG. 1.
Figure 9:
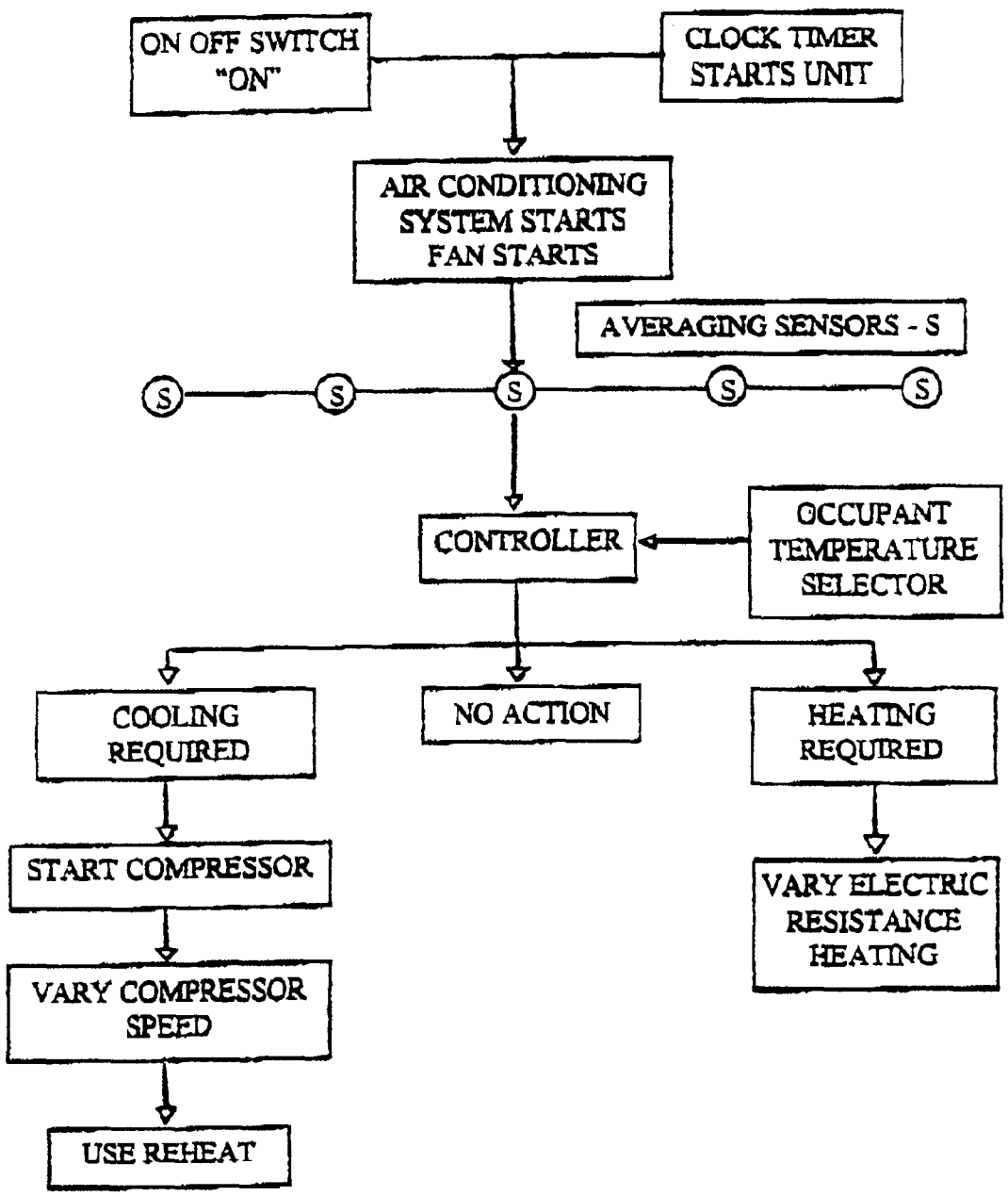
FIG. 9 is a block diagram illustrating the decision process flow in a control system for the chair of FIG. 1.

Control of the system is maintained from a user friendly panel 15 in the right hand arm rest, see FIG. 8. This may for example have an LED display. Sensors will be located in the head rest 7, side wings 8, arm rests 9, and return air ducts. Signals from these will be averaged to give a reading on the panel 15. The system will maintain this average temperature by controlling the cooling unit 10. The occupant can vary the temperature by controlling the cooling unit 10. The occupant can vary the temperature at will, though a "slow down" mechanism will protect the cooling unit from excessive adjustment. A second control system also located on the control panel 15 enables the occupant to vary the temperature in the leg area air bubble. Sensors for this bubble are located on the underside of the seat and in the return air from the seat bottom.

The seat will be configured to provide maximum air conditioned comfort for the occupant by providing an air bubble in which he works, and over which he has complete temperature control. Some air may be directed into the seat foam and fabric 31 to help maintain the air bubble around the seat occupant.

This invention provides a seat essentially for use by people engaged in office work. Their upper body may not be in contact with the back support for long periods as they lean forward over their desks. The invention provides an air bubble of about 1 m³ which is a comfort zone for the occupant who has personal control of the air bubble temperature. This includes a separately controlled zone for the leg area. Some air will be discharged into the foam of the back support and seat bottom to complete the comfort zone.

Cooling will normally be by a refrigerated cooling unit for efficiency. A Peltier thermocouple has a COP of 0.4–0.7 compared with refrigerated cooling at a COP of 2.2–2.8 and would not be acceptable where large numbers are required in an office building. However where other factors are critical, like very low sound levels, high reliability, or lack of service capacity for refrigeration systems, Peltier units remain an option.

The cooling can be by a reversible heat pump or the refrigeration equipment can be used for cooling only with electric resistance heating. In "full building" air conditioning systems a heat pump is favoured because on reverse cycle heating it pumps "free" heat from outside the building to heat the inside of the building at about a 3:1 efficiency ratio. In the present invention the heat pump is located inside the building and extracts heat from the room air around the seat leaving the room air colder. The room air then has to be reheated to minimise discomfort for people walking around. While overall the heat pump adds the motor heat of the compressor to the room, it concentrates available heat on the seat. The heat pump adds complexity and cost to the refrigeration circuit, and generates extra condensate on the reverse cycle which is difficult to disperse into the room air. The main advantage of a heat pump is free heat from outside the building which is not available in this application.

Refrigerated cooling with electric resistance heating is therefor favored. Heat losses from the air bubble help to heat the office space. The system may use either an AC or DC hermetic refrigeration compressor, depending on the load and degree of temperature control required for the air bubble. These will be operated in a variety of ways including speed control to provide close temperature control, safety and performance.

The air conditioning equipment is located in the base of the seat beneath the seat bottom. It provides heated or cooled air through ducts to the discharge points on the back support and seat bottom which maintain the air bubble as a comfort zone. Return air is drawn back through the back support and seat bottom to maintain the air bubble in the two zones. Discharge points will vary in different seat styles but in the back support will typically be located in the side wings, at the top or head rest if provided, and in the arm rests. Discharge points in the seat bottom will be in the front edge, and beneath the seat bottom. Return air points will be inboard of the discharge points.

When the seat is in cooling mode hot air from the condenser coil in the seat base will be discharged into the room air behind the seat and will raise the room temperature around the seat. A separate building system will ensure that building and room temperatures do not exceed the design specification when the seat is in either heating or cooling mode. The temperatures maintained by the building system are selected to ensure that the office areas between the seats remain at physiologically acceptable temperatures for people moving around. They also serve as a design specification for the seats. However a separate range of seats could be made available for more extreme ambient levels when the seats are used in buildings without any form of internal ambient temperature control. This means that occupants leaving their seats will be subject to more extreme conditions.

The seat occupant can select the temperatures of the two comfort zones on a control panel located in the arm rest of the seat. Sensors will be located in the end of the arm rests, the head rest, seat bottom, and in the return air to help control the supply air temperature into the zones. The use of return air helps to reduce the cooling and heating load on the system. An electronic controller selects either a cooling or heating cycle for the refrigeration system. Various systems will be used, particularly for cooling, depending on the quality of control desired. Some seats will maintain tolerances of ±1° C. and others ±0.5° C. The control panel will have a clear visual display showing air bubble, set point, and room temperatures, filter conditions, maintenance requirements, and warning signals indicating system failures.

Therefor the present invention can be seen to provide an air conditioning system for commercial buildings based on a temperature controlled environment generated for an office seat. The seat incorporates refrigerated cooling, electric resistance heating, and an air distribution system to provide an air bubble for the occupant which becomes their personal, temperature-controlled, comfort zone. The air bubble allows the occupant to move around and lean forward on the seat but still remain in the comfort zone. The air conditioning equipment is mounted in the base beneath the seat and consists of a compressor, coils, fans, heating elements and controls. The air bubble normally has two comfort zones able to be controlled at different temperatures, one for the upper body and one beneath the seat for the legs, though some seats may provide just one zone. The air conditioning equipment provides warm or cold air through ducts or a plenum in the back support of the seat to discharge points which distribute air forward of the back support to create the air bubble around the occupant. Some air may also be discharged into the foam and fabric of the back support as part of the comfort zone. A second system located in the seat bottom distributes air through the seat bottom to create an air bubble in the leg area. A return air system helps to form the air bubble in each zone and reduce the total cooling and heating load.

In a typical office the space cooled or heated is reduced to the air bubble comfort zone around the seat occupant. The rest of the office air becomes a heat sink for the cooling system.

A control panel for the seat air conditioning system is mounted in the arm rest giving the occupant complete control of the seat environment. The seats can function in fully, partly or non air conditioned buildings.

An integrated building air conditioning system is provided to incorporate and effectively utilise the seats. This will provide fresh and exhaust air to the building plus a minimum amount of heating and cooling to maintain temperatures in the air surrounding the seats at 14–16° C. minimum and 24–27° C. maximum. This provides a minimum comfort level for building occupants walking around and the design ambient specification for the matching seats will be 12° C. minimum to 30° C. maximum. The intention is that close temperature control is only available at the seats. Public areas requiring close control will be handled with conventional systems like heat pumps except that the "outside unit" of the heat pump will normally be placed inside the building.

A range of seats may be provided to operate at other ambient temperature ranges within buildings including domestic buildings which are not air conditioned.

Seats may use a heat pump system for cooling and heating.

The claims defining the invention are as follows:

1. A self contained air conditioned seat to control the temperature climate in an air bubble generated around the seat occupant comprising:

a cooling and heating system to generate warm or cool air;

an air distribution system in the back support and arm rests which receives air from said cooling and heating system and distributes it to maintain an air bubble at a controlled temperature for the upper body and the seat of the occupant;

an air distribution system beneath the seat which receives air from said cooling and heating system and distributes it to a separate air bubble for the legs of the occupant;

a controller which activates the cooling and heating and air distribution systems to maintain temperatures selected by the seat occupant and allow the occupant to have personal control of the temperature in the two air bubbles; and temperature sensors for the controller located in one or more of the tips of the arm rests, the head rest and beneath the seat bottom to help maintain the temperature in the two air bubbles.

2. A self contained air conditioned seat as claimed in claim 1 wherein said cooling and heating system is located in a base of said seat, it includes a pump to expel said generated warm or cool air into distribution plenums or ducts in the back support and seat bottom area of the seat.

3. A self contained air conditioned seat as claimed in claim 1 wherein said cooling and heating system comprises a refrigeration cooling package including a complete vapor compression refrigeration system and an alternately activated by electric resistance heating element.

4. A self contained air conditioned seat as claimed in claim 3 wherein the compressor of said vapor compression refrigeration cycle includes a variable capacity compressor control for variable refrigeration capacity with continuous compressor operation.

5. A self contained air conditioned seat as claimed in claim 3 wherein said vapor compression refrigeration system discharges air past or over said condenser to cool said condenser in a rearward direction to the area behind said seat.

6. A self contained air conditioned seat as claimed in claim 1 wherein said air distribution system in the back support includes means to discharge cooled or heated air into the user's support surface of the seat back.

7. A self contained air conditioned seat as claimed in claim 1 wherein said air distribution system in the back support or beneath the seat includes means to discharge cooled or heated air in the user's support surface of the base of said seat.

8. A self contained air conditioned seat as claimed in claim 1 including a user's input/output device located in the armrest of said seat and communication means for linking said user input/output device and said controller.

9. A self contained air conditioned seat as claimed in claim 1 wherein said cooling and heating system includes a vapor compression refrigeration system and means to supply air past or over the evaporator of said system to said air distribution systems in a cooling mode and air past over the condenser of said vapor compression refrigeration system to said air distribution systems in a heating mode.

10. A self contained air conditioned seat as claimed in claim 1 wherein said cooling and heating system comprises a pelter thermoelectric system.

11. A self contained air conditioned seat as claimed in claim 10 wherein said cooling and heating system includes first and second pelter thermoelectric modules associated with the back support air distribution system and the beneath the seat air distribution system respectively.

12. A self contained air conditioned seat as claimed in claim 10 wherein said pelter thermoelectric modules are used for cooling only and electric resistance heating elements are provided adjacent to said pelter thermoelectric modules for air flow heating in a heating mode.

13. A self contained air conditioned seat as claimed in claim 1 wherein said cooling and heating system includes a first module including a compressor, a condenser, and a condenser fan located in the seat base, two or more evaporators with associated evaporator fans, one evaporator and evaporator fan being located in at least each of said back support and beneath the seat air distribution systems, and refrigerant distribution and return piping connecting said first module with said evaporators.

* * * * *